United States Patent
Nijim et al.

(10) Patent No.: US 9,491,504 B1
(45) Date of Patent: Nov. 8, 2016

(54) WIRELESS SET-TOP BOX PAIRING AND QUALITY OF SERVICE USER INTERFACE

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Anant Patil, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/243,830

(22) Filed: Apr. 2, 2014

(51) Int. Cl.
| H04N 5/445 | (2011.01) |
| H04N 7/173 | (2011.01) |
| H04N 21/438 | (2011.01) |
| H04N 21/442 | (2011.01) |
| H04N 21/462 | (2011.01) |

(52) U.S. Cl.
CPC .... *H04N 21/4383* (2013.01); *H04N 21/44209* (2013.01); *H04N 21/4622* (2013.01)

(58) Field of Classification Search
CPC ............... H04N 21/442; H04N 21/44209; H04N 21/4622
USPC ....................................... 725/107, 94, 49, 48
See application file for complete search history.

(56) References Cited

U.S. PATENT DOCUMENTS

| 8,661,472 | B1* | 2/2014 | Kardatzke | H04N 21/482 725/48 |
| 2008/0022298 | A1* | 1/2008 | Cavicchia | H04N 5/44543 725/25 |
| 2008/0301749 | A1* | 12/2008 | Harrar | H04N 5/44543 725/131 |
| 2010/0203823 | A1* | 8/2010 | Apaar | H04H 20/20 455/3.06 |
| 2010/0299552 | A1* | 11/2010 | Schlack | H04L 47/10 714/4.1 |
| 2013/0262554 | A1* | 10/2013 | Chen et al. | 709/201 |
| 2013/0322522 | A1* | 12/2013 | Nilsson | H04N 21/23424 375/240.02 |
| 2014/0026170 | A1* | 1/2014 | Francisco | H04L 12/2834 725/80 |
| 2015/0040172 | A1* | 2/2015 | Zelesko et al. | 725/110 |

* cited by examiner

*Primary Examiner* — James R Sheleheda
(74) *Attorney, Agent, or Firm* — Merchant & Gould P.C.

(57) ABSTRACT

A method and system for monitoring the quality of the content is provided. The method and system may identify, in real time, whether the quality of the content has fallen below a predetermined threshold. Once the quality of the content has fallen below a predetermined threshold, the system may identify other delivery mechanisms (e.g., connectivity options and/or other sources) to deliver the content at a lower constant bitrate. Subsequently, the system may check for higher quality content and provide the user with options to switch to the other source. Accordingly, the method and system identifies the available video quality options for a specific content item, which may be provided by a plurality of different content sources, and provides the user with the ability to switch to another content source with minimal user input.

20 Claims, 8 Drawing Sheets

WIRELESS SET-TOP BOX PAIRING AND QUALITY OF SERVICE USER INTERFACE

BACKGROUND

Video consumers today are provided with some options for viewing content in a variety of video formats, e.g., standard definition quality, high definition quality, etc. Customers of cable multiple systems operators (MSOs), telephone companies (telcos), and satellite video providers may typically be provided with hundreds of channels of linear content and thousands of pre-recorded "on-demand" movies and television shows with different qualities and bitrates from which to watch. Further, users have several connectivity options and viewing devices that may be used to access the content. For example, customers may access content from a wireless router/set-top box connected to a wired set-top box or digital video recorder (DVRs). With the options available, the quality of the content provided may significantly vary because of bitrates, connectivity, network traffic or the determination of a format option for the viewer.

To further personalize the user experience, if a choice may be given with a better viewing option with higher constant bitrate, when available, it may take the user experience to a new level.

SUMMARY

Embodiments of the present invention may be utilized to monitor the quality of the content. For example, in one embodiment the system identifies, in real time, whether the quality of the content has fallen below a predetermined threshold. Once the quality of the content has fallen below a predetermined threshold, the system may identify other delivery mechanisms (e.g., connectivity options and/or other sources) to deliver the content at a lower constant bitrate. It should also be noted that by utilizing different connectivity options, such as other wired set-top boxes available for pairing and other sources such as DVR, VOD and the Internet, the system may provide other enhanced video quality options.

At a subsequent time, the system may also check for higher quality content, in real time or at regular intervals, such as checking for the original quality content from the original source. Once higher quality content has been identified, the system may provide the user with options to switch to the other source. Upon receiving a selection from the user, the system switches to the other content source having higher quality content.

Accordingly, a user may appreciate that the system identifies the available video quality options for a specific content item, which may be provided by a plurality of different content sources, and provides the user with the ability to switch to another content source with minimal user input.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention.

BRIEF DESCRIPTION OF DRAWINGS

Referring now to the drawings in which like reference numbers represent corresponding parts throughout.

DETAILED DESCRIPTION

Figure 1:
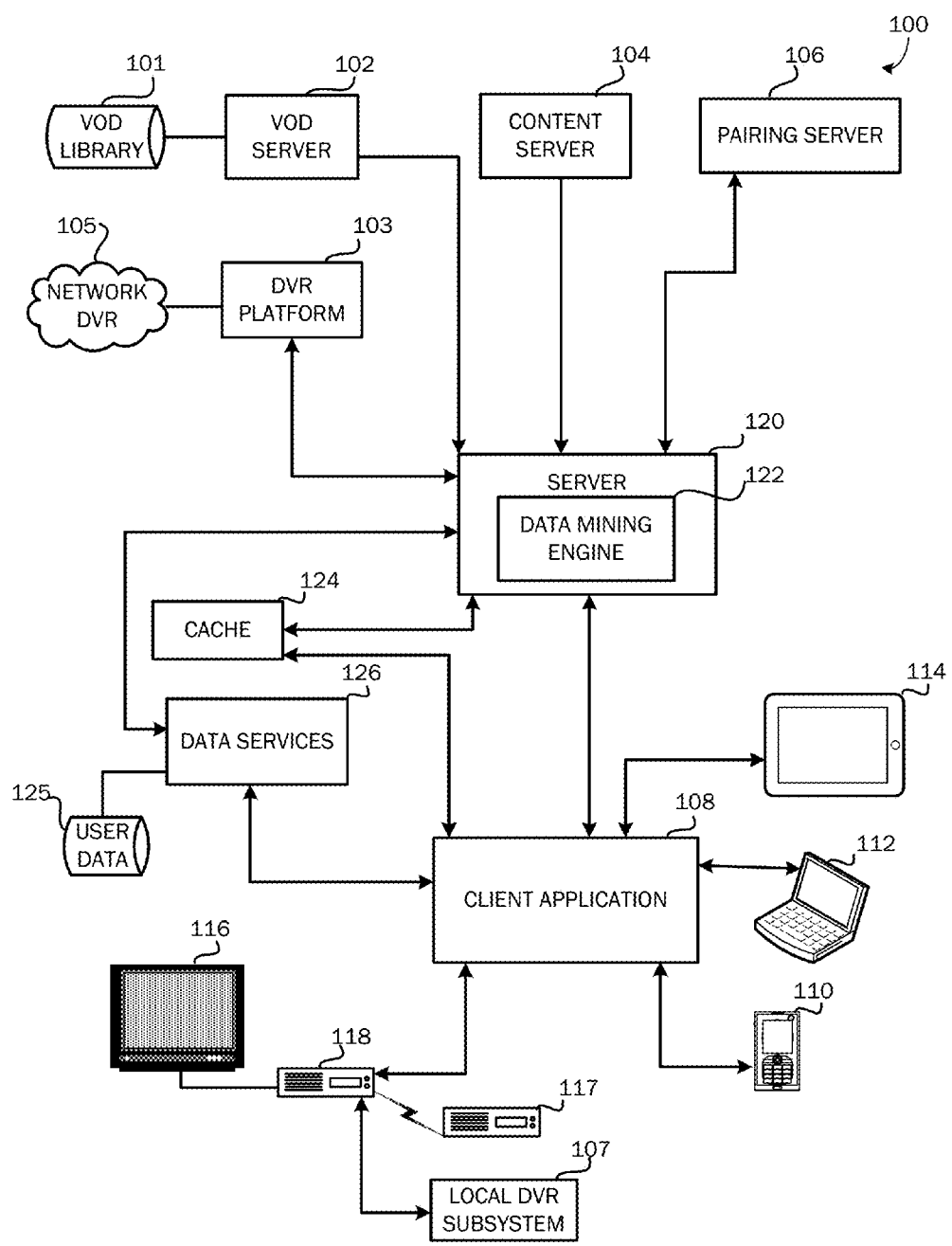
FIG. 1 is a block diagram illustrating a system for providing wireless set-top box pairing and quality of service user interface.

As briefly described above, embodiments of the present invention may be utilized to monitor quality of the content item being provided on the viewing device, in real time or at regular intervals, based on business rules and business agreements. For example, in one embodiment the system identifies, in real time, whether the quality of the content has fallen below a predetermined threshold. Once the quality of the content has fallen below a predetermined threshold, the system may identify other delivery mechanisms (e.g., connectivity options and/or other sources) to deliver the content at a lower constant bitrate. Different connectivity options may provide the content item at an acceptable higher constant bitrate or a lower constant bitrate. Other sources such as DVR, VOD and the Internet may also provide enhanced video quality options. At a subsequent time, the system may also check for higher quality content, in real time or at regular intervals, such as checking for the original quality content from the original source. Once higher quality content has been identified, the system may provide the user with options to switch to the other source. Upon receiving a selection from the user, the system switches to the other content source having higher quality content. In case of nonlinear content, bookmarks and timestamps may also be managed to switch seamlessly.

For example, a user may be viewing high definition (HD) content with a viewing device, wirelessly in connection with a wired set-top box. The system may be continually monitoring the quality of the content item being delivered. Once the system identifies that the content item cannot be provided with HD quality, such as a result of a network connection, the system looks for other possible connectivity options, such as another wired set-top box that may be available for the viewing device to connect in a wireless fashion. If the system identifies that content item can be provided in HD quality through the other connectivity option, then it may use that connection and provide HD quality content to the user's viewing device. This function of the system may be performed without any user input and with minimal disruption to the video output. In another embodiment, the system may provide a user interface via the client application to notify the user and receive user input on whether to switch the connectivity option for maintaining video quality.

Alternatively, if the content item cannot be provided in HD quality through other connectivity options, then the system may be operable to search for a lower constant bitrate item, e.g., a standard definition (SD) content item, and provide it to the user's viewing device. As mentioned earlier, other sources such as DVR, VOD and the Internet may also provide enhanced video quality options. According to an embodiment, the system may provide the content item at a lower constant bitrate for a very short duration, until the system can provide the content item at a higher constant bitrate or from the original source.

An approach utilized by embodiments of the present invention provides a system that identifies the available video quality options for a specific content item, which may be provided by a plurality of different content sources, and provides the user with the ability to switch to another content source with minimal user input.

These embodiments may be combined, other embodiments may be utilized, and structural changes may be made without departing from the spirit or scope of the present invention. The following detailed description is therefore not to be taken in a limiting sense. Referring now to the drawings, in which like numerals refer to like elements throughout the several figures, embodiments of the present invention and an exemplary operating environment will be described.

FIG. 1 is a block diagram of a system 100 for providing wireless set-top box pairing and quality of service user interface, according to an embodiment. Components of the system 100 may operate as a distributed system where each component is accessed via a suitable network, or the components may operate together as an integrated system. As illustrated, content server 104, network DVR platform 103, local DVR subsystem 107, VOD server 102 and pairing server 106 may be provided. Content server 104 may include video content data and metadata available via a service provider, such as cable television (CATV) services system (as illustrated and described below with reference to FIG. 7), satellite television provider, or a provider on the Internet such as YouTube®, Hulu®, etc. The data and metadata may include information such as video content title, storyline, cast, genre, rating, release date, images, etc.

Pairing server 106 may comprise data and metadata related to the content, quality of the content (e.g. megapixels, constant bitrates, higher quality compression due to dedicated chip etc.), various devices that may be provisioned for the household account with a wired connection or wirelessly, etc. According to embodiments, the pairing server 106 may also include data and metadata about the resources available that enable the system to apply mechanisms, independent of the signal strength, to improve the content delivery to the viewing device.

Network DVR platform 103 may comprise various DVR recordings or pointers to various DVR recordings recorded on a network DVR 105 that may be available for viewing to the user. DVR recordings may also be stored locally via a local DVR subsystem 107 connected to a set-top box 118 in communication with a television set 116.

VOD server 102 may provide access to various VOD content items, stored either within the VOD library 101 maintained by the content provider, or the VOD content that may be available via the Internet. VOD server 102, network DVR platform 103, pairing server 106 and content server 104 may be provided to a server 120 where a data mining engine 122 may be operable to analyze the data and metadata from the pairing server 106 in relation to the user subscription data to provide the method for providing wireless set-top box pairing and quality of service user interface.

The associated channel/guide/content/contacts data may be cached. The cache 124 is illustrated in FIG. 1 as a remote element, but may be integrated with the server 120 or the client application 108. As new information becomes available, the associated channel/guide/content/contacts data may be updated in the cache 124.

The system 100 may include a data services system 126 which may comprise such information as billing data, permissions and authorization data, user profile data, etc., and its data may be stored in a user database 125. The data services system 126 may be accessed by the data mining engine 122 for checking permissions, subscriptions, and profile data.

As illustrated in FIG. 1, various endpoint devices may be paired to provide the best possible content quality for display on the viewing device. For example, endpoint devices may include, but are not limited to, a mobile communication device 110, such as a mobile phone, a computing device 112, such as a desktop computer, a laptop computer, etc., a wireless computing device, such as a tablet computing device 114, a television set 116, such as an Internet-connected television or a television connected to a network-connected device, such as a wired set-top box (STB) 118 or a wireless set-top box 117. An endpoint device 110,112,114,116 may be utilized to access a client application 108. According to embodiments, wireless set-top box 117 may be able to connect wirelessly to one or more wired set top boxes within a same household account.

The client application 108 may be operable to receive information regarding the content, content quality data and metadata, and provide it to the server 120 wherein the data mining engine 122 may be operable to analyze the information received from the client application 108 in relation with data regarding devices capable of pairing from the pairing server 106 etc. The client application 108 may be able to continually check if the quality of the content being delivered meets the predetermined threshold set, based on business agreements and business rules. Once the client application 108 identifies that the content quality may have fallen below the predetermined threshold, perform various checks in order to identify and provide the content item with a lower constant bitrate using other connectivity options and/or from other sources.

As can be appreciated, while the lower constant bitrate content is being provided for display on the viewing device, the client application 108 may be operable to continually check if, either through an improved network connection or through other mechanisms deployed by the system, the content item may be provided at a higher constant bitrate, for display on the viewing device from the original source. Once it may be identified if the content item may be made available for display on the viewing device, the client application 108 may be operable to provide with user interfaces as illustrated in FIGS. 2 and 3 for the user to selectively indicate if he/she wishes to switch to the higher constant bitrate content delivery.

A designated button or other selectable control on a remote control or other suitable hard or soft key selection device may also be used to accept input for switching to the higher constant bitrate content. A secondary screen companion device such as a tablet or other hand held computing device with an associated content provision application may also be used to accept input for switching to the higher constant bitrate content. Other suitable means for switching to the higher constant bitrate content may include touch command, voice command, gesture command and combinations of various functionality interface methods and systems.

The associated channel/guide/content data may be stored in a cache 124 located on the server 120, on the application 108, or may be located remotely and accessed via a network.

Figure 2:
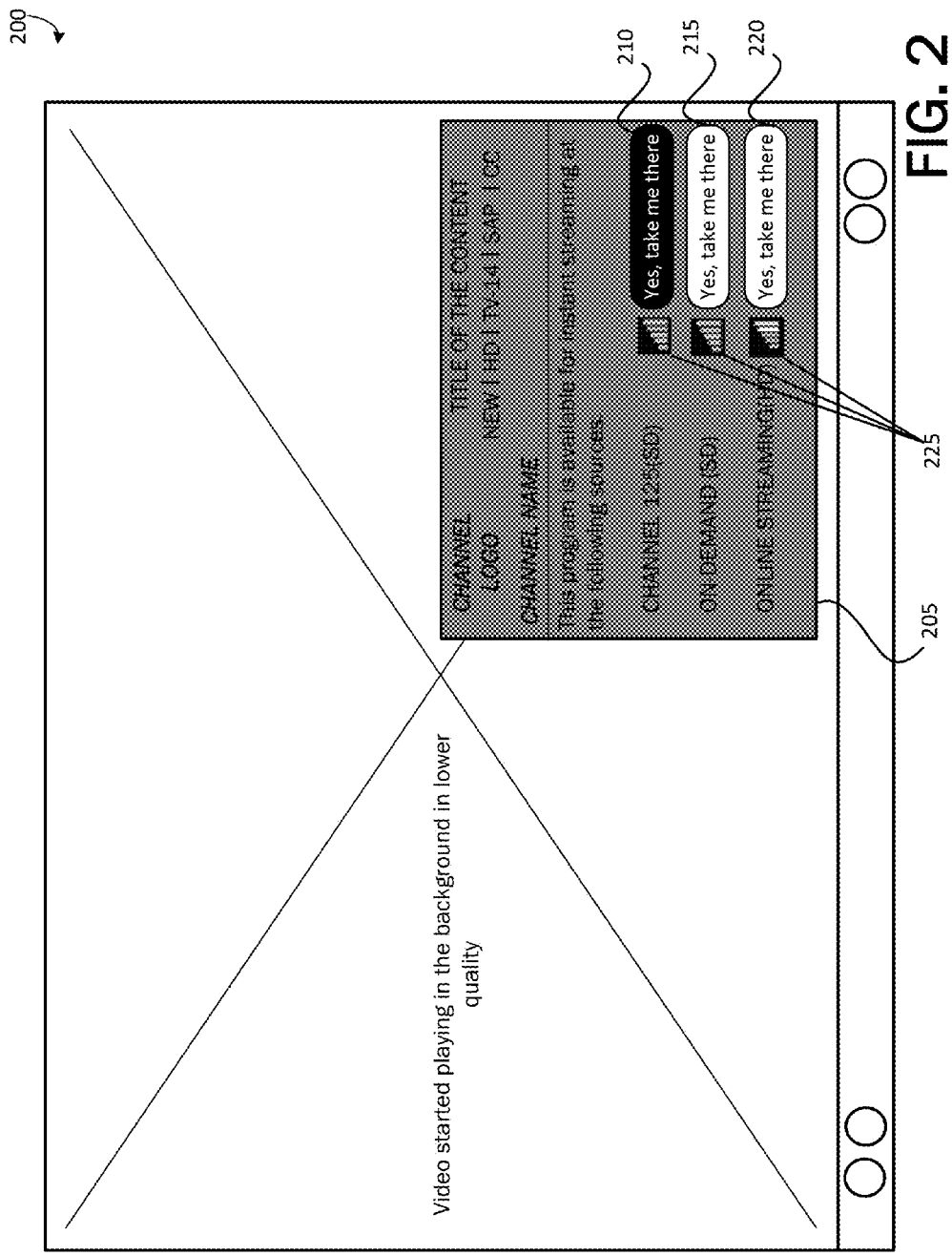
FIGS. 2 and 3 are illustrations of user-interfaces for providing an option to switch to a higher constant bitrate content delivery, according to an embodiment.
Figure 3:
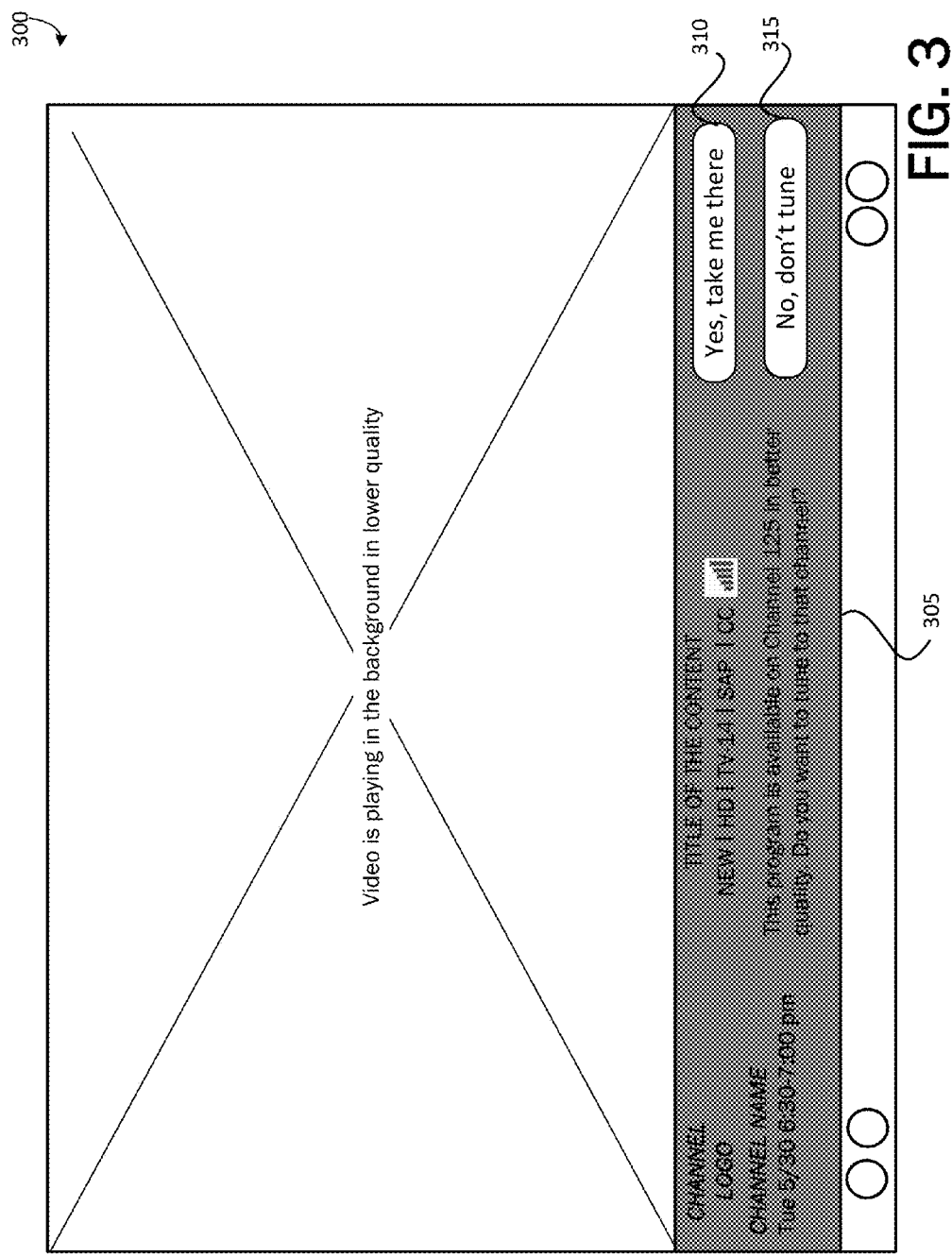

FIG. 2 is an illustration of a user-interface 200, for providing an option to switch to a different source, according to an embodiment. For example, if skipping, buffering, or an interruption occurs while a user is viewing a higher constant bitrate item that results in degraded quality, a pop up window 205 in the user interface 200 may notifying the user that the content item may be available in a lower or similar bitrate at one or more different sources. In the illustrated example, three options are each selectable by a button 210, 215, 220. Each of the options may also present connectivity strength bars 225 which may provide information regarding which of the sources may have better connectivity strength to provide the content available from that source. Bitrate information may also be provided for the user. In our example, selectable button 210 may provide the content item via another channel at a lower constant bitrate, selectable button 215 may provide the content item via an on demand service at a lower constant bitrate, and selectable button 220 may provide the content item via an Internet source at a higher constant bitrate.

Once the user switches to view the content from another source, the system may monitor in real time if the original quality content item from the original source may be available. Once the original quality content from the original source becomes available, the system may provide the user with a user interface 300 as illustrated in FIG. 3.

FIG. 3 is an illustration of a user-interface 300 for providing an option to switch to a higher constant bitrate content delivery, according to an embodiment. While a lower quality content item may be presented to the user's viewing device from another source, a notification 305 may be presented to the user in the form of a popup or a banner when the system identifies that the original quality content from the original source is available. Selectable button 310 may provide the option to switch to viewing the original quality content provided by the original source. Alternatively, selectable button 315 may provide the option to the user to continue consuming content via the current source.

Figure 4A:
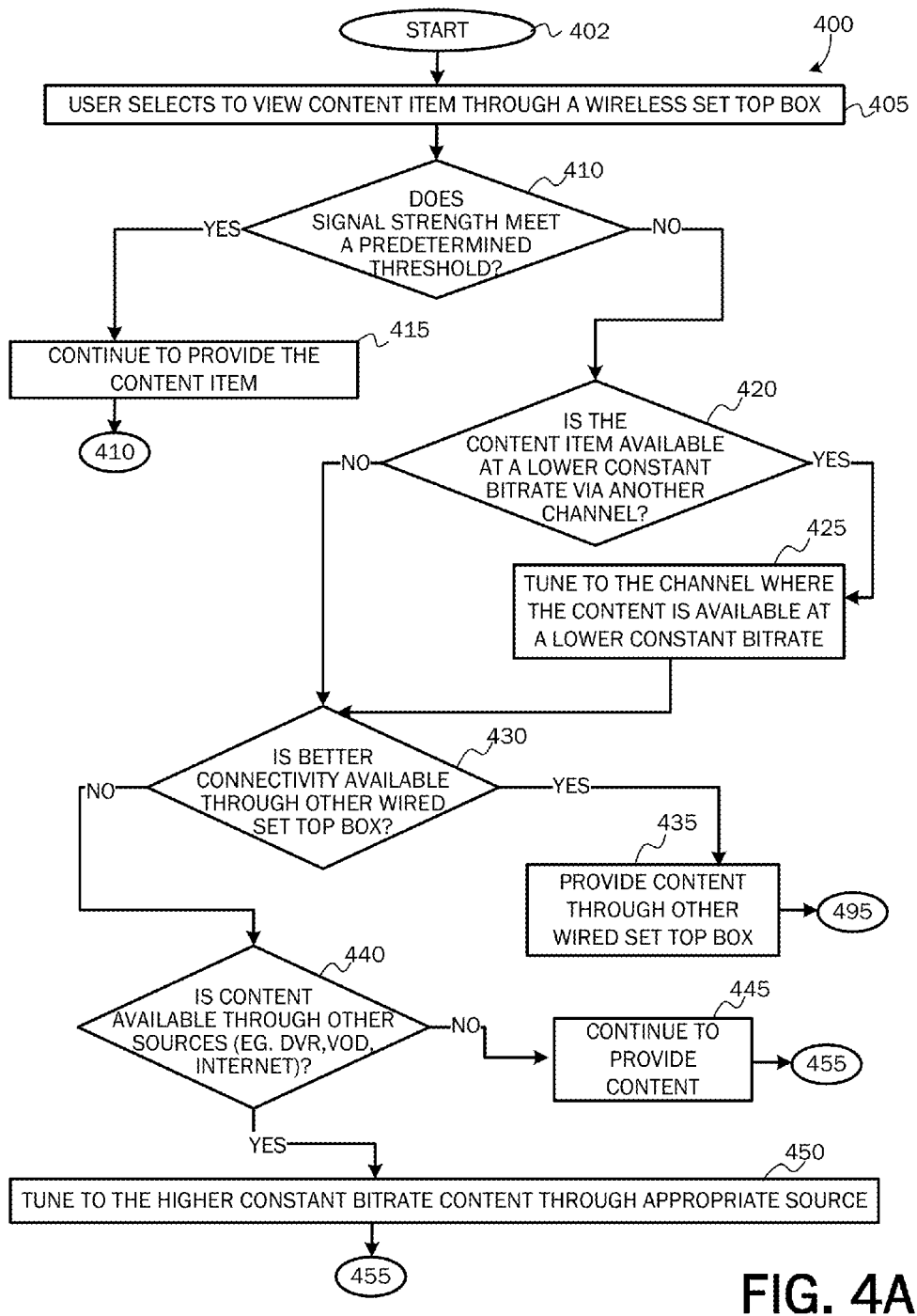
FIGS. 4A and 4B are flow charts of a method for providing wireless set-top box pairing and quality of service user interface, according to an embodiment.
Figure 4B:
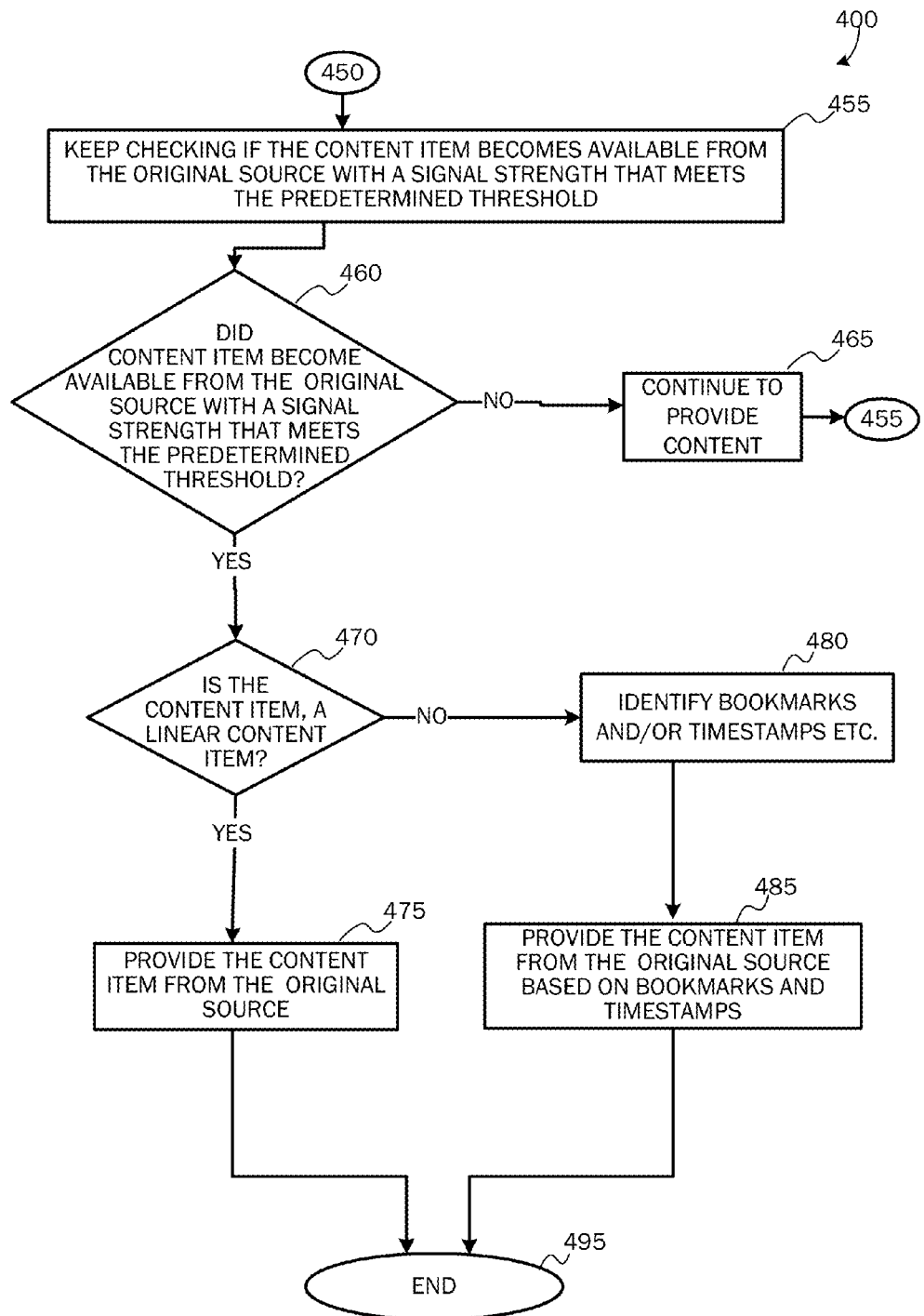

FIGS. 4A and 4B are flow charts of a method 400 for providing a quality of service user interface, according to an embodiment. The method 400 starts at OPERATION 402 and proceeds to OPERATION 405 where a higher constant bitrate content item may be provided to a users viewing device wirelessly for example via a wireless set-top box 117 through a WIFI connection. The method 400 proceeds to OPERATION 410, where a check may be performed in real-time at regular intervals, based on business rules and business agreements, whether the content is being provided at or above a predetermined signal strength threshold.

If at OPERATION 410, a determination is made that the content item is being delivered at a higher constant bitrate at an acceptable signal strength, then the method 400 proceeds to OPERATION 415, where the content item may continue to be provided. As can be appreciated, while the content item is being delivered at the acceptable higher constant bitrate at OPERATION 415, the method 400 may still be continually checking for the output quality. If at OPERATION 410, a determination is made that the higher constant bitrate content item is not being delivered at acceptable signal strength, then the method 400 proceeds to DECISION OPERATION 420, where a check may be performed to determine whether the content item may be available at a lower constant bitrate via another channel.

If a determination is made at DECISION OPERATION 420 that the content item is not available at a lower constant bitrate via another channel, then the method 400 proceeds to another DECISION OPERATION 430, where a check may be performed if there are any other wired devices available to establish a wireless connection which may enable providing the content item at acceptable higher constant bitrate.

If a determination is made at DECISION OPERATION 420 that the content item is available at a lower constant bitrate via another channel, then be method 400 proceeds to OPERATION 425, where the lower constant bitrate content item may be provided on the viewing device and then to DECISION OPERATION 430, where a check may be performed if there are any other wired devices available to establish a wireless connection which may enable providing the content item at acceptable higher constant bitrate.

As can be appreciated, the OPERATION 425 may be performed to provide the most seamless viewing experience as possible, because the user may be provided with the best available viewing experience, even for a relatively short amount of time it may take for the system to perform DECISION OPERATION 430.

If at DECISION OPERATION 430 it is determined that there is another wired set-top box(s) available for establishing an alternate wireless connection and the content item can be made available to the viewing device at a higher constant bitrate, through the alternate wired set-top box that may be available, the method 400 proceeds to OPERATION 435. At OPERATION 435 the content item may be made available to the viewing device at a higher constant bitrate with acceptable quality through the alternate wired set-top box and ends at OPERATION 495.

If at DECISION OPERATION 430 it is determined that the content item cannot be made available to the viewing device at a higher constant bitrate, the method 400 proceeds to DECISION OPERATION 440. For example, in one embodiment there may not be other wired set-top boxes available for establishing an alternate wireless connection. In another embodiment, if another wired set-top box is available, the content item may not be available to the viewing device at a higher constant bitrate due to connectivity or other issues.

At DECISION OPERATION 440, the system checks for other sources such as the DVR, VOD or the Internet etc., where the content item may be available at a higher or a lower constant bitrate.

If at DECISION OPERATION 440, it may be determined that the content is available through other sources, at a higher or a lower constant bitrate, the method 400 proceeds to OPERATION 450 where the content item may be provided via the other identified source at a higher or a lower constant bitrate. The method 400 may then proceed to OPERATION 455.

If at DECISION OPERATION 440, it may be determined that the content is not available through other sources, the method 400 proceeds to OPERATION 445 where the content item may continue to be delivered and the method may proceed to OPERATION 455.

At OPERATION 455, a check may continually be performed, in real time to determine if the content item may become available at the acceptable higher constant bitrate from the original source. As can be appreciated, at OPERATION 455 the system may not merely check for signal strength available for providing the content item, the system may also have a plurality of mechanisms deployed in order to provide the content item at a higher constant bitrate.

According to an embodiment, steps involved from OPERATION 410 through OPERATION 450 may be performed to handle the time it may take for the system to achieve the ability to provide the content at an acceptable higher constant bitrate through the plurality of mechanisms as mentioned above, in order to provide the viewer with seamless experience.

The method 400 then proceeds to DECISION OPERATION 460 where the system identifies if the content item is available at the higher constant bitrate from the original source. If at DECISION OPERATION 460 it may be determined that the content item is not available at the higher constant bitrate from the original source, the method 400 may continue to provide the content item at OPERATION 465 and revert back to OPERATION 455. Alternatively, if at DECISION OPERATION 460 it may be determined that the content item is available at the higher constant bitrate from the original source, the method 400 proceeds to DECISION OPERATION 470 where a check may be performed if the content item is a linear content item.

If at DECISION OPERATION 470 it is determined that the content item is a linear content item then the method 400 proceeds to OPERATION 475 where the system tunes the viewing device to provide the content item from the original source at the higher constant bitrate and ends at OPERATION 495. Whereas, if at DECISION OPERATION 470 it is determined that the content item is a nonlinear content item, then the method 400 proceeds to OPERATION 480 where the bookmarks, timestamps etc. may be identified from the current playback. At OPERATION 485 the content item is provided at a higher constant bitrate from the original source based on the bookmarks, timestamps etc. The method ends at OPERATION 495.

Figure 5:
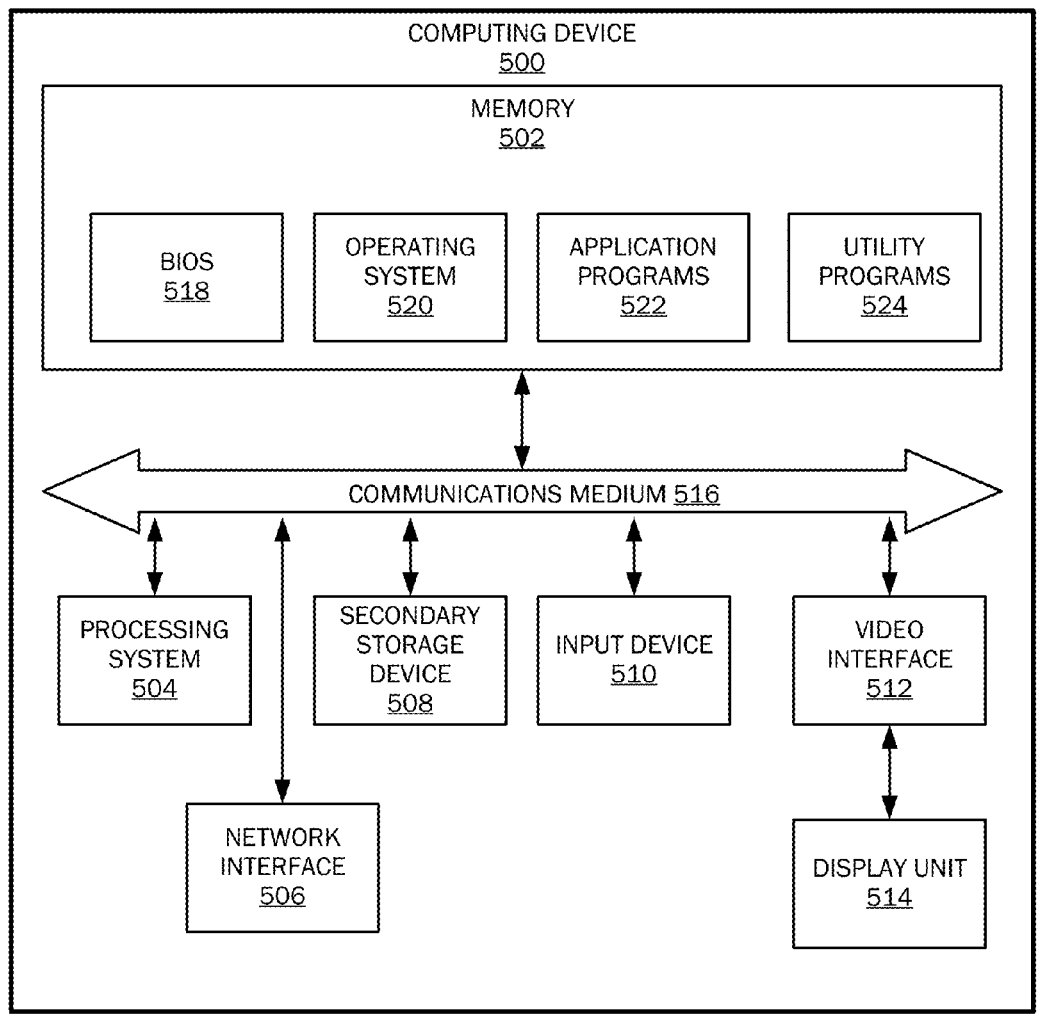
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the system 100 may be implemented using one or more computing devices like the computing device 500. It should be appreciated that in other embodiments, one or a combination of the components of the system 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, and a display unit 514. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. Memory 502 thus may store the computer-executable instructions that, when executed by processing system 504, provide creation of one or more channel(s) or guide with trending content items from the user's associated social network(s) as described above with reference to FIGS. 1-4.

In various embodiments, the memory 502 is implemented in various ways. For example, the memory 502 can be implemented as various types of computer-readable storage media. Example types of computer-readable storage media include, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other articles of manufacture that store data.

According to embodiments, the term computer-readable media includes communication media. Communication media includes information delivery media via a data signal or modulated carrier wave. Computer-executable instructions, data structures, program modules may be embodied on a communications medium. For example, communication media can include wired media, such as a wired network or direct-wired connection, and wireless media, such as acoustic, radio frequency (RF), infrared, and other wireless media.

The term computer-readable storage medium refers only to devices and articles of manufacture that store data and/or computer-executable instructions readable by a computing device. Computer-readable storage medium do not include communications media. The term computer-readable storage media encompasses volatile and nonvolatile and removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figure 6:
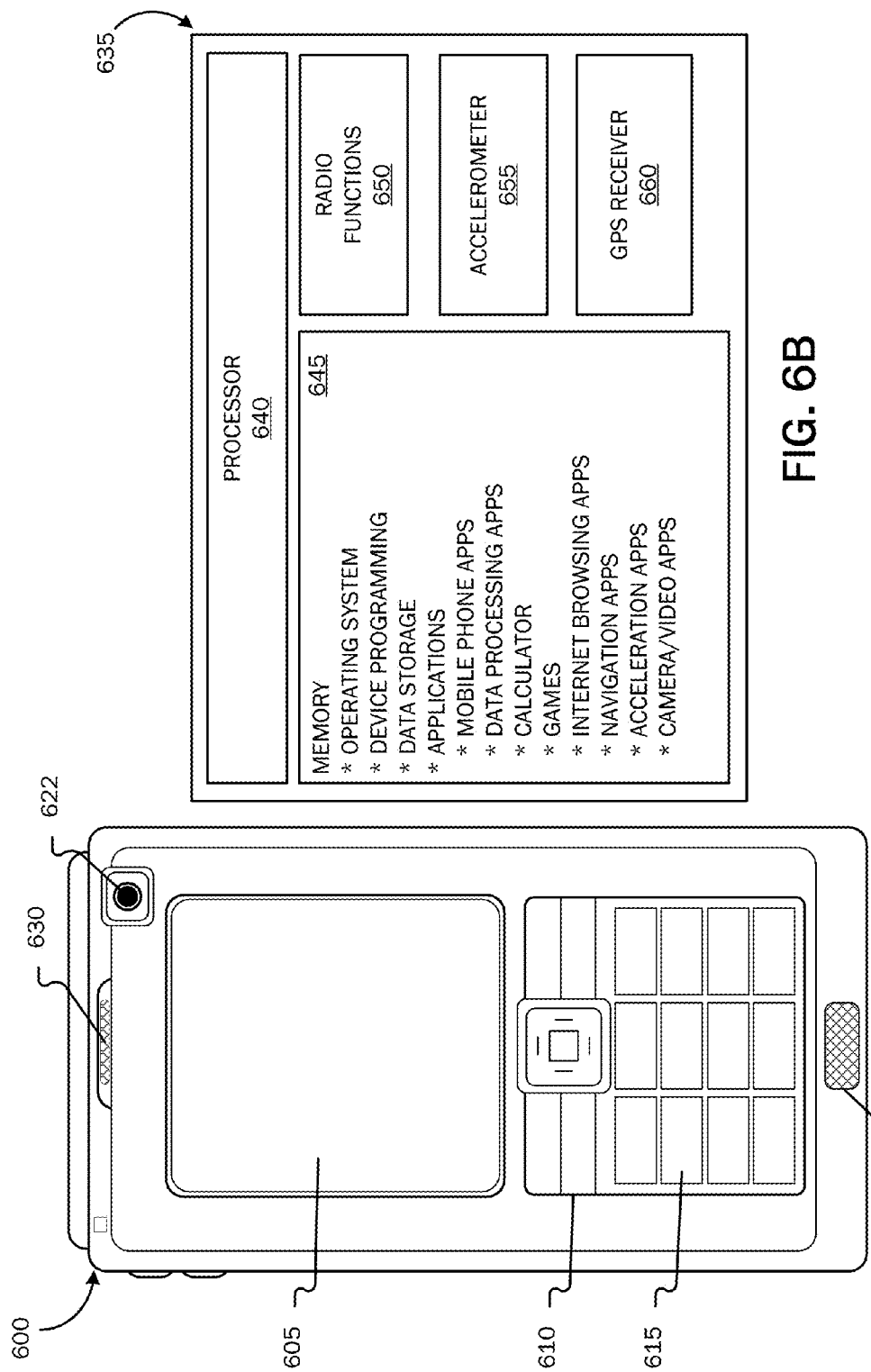
FIGS. 6A-6B illustrate a suitable mobile computing environment with which embodiments may be practiced.

FIGS. 6A-6B illustrate a suitable mobile computing environment, for example, a mobile computing device 600, a mobile phone/smartphone, a tablet device, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the mobile computing device 600 may be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 622 functionality associated with the mobile computing device, or any other suitable input means. Data may be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, application software to analyze wireless set-top box pairing and quality of service user interface may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, where the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 may be utilized to communicate with a wireless or Wi-Fi based positioning system to determine a location of a device 600.

Figure 7:
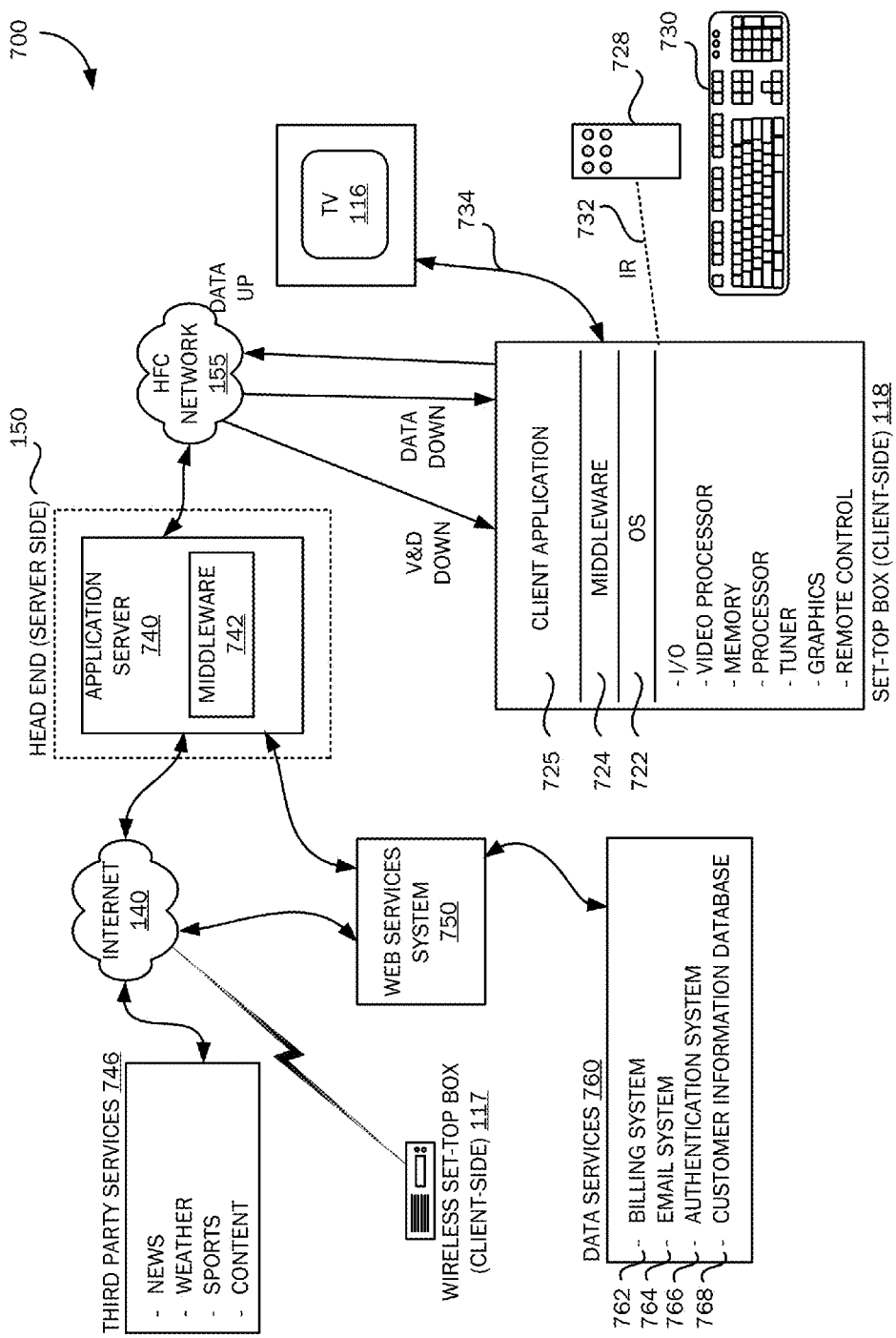
FIG. 7 is a block diagram illustrating a cable television services system architecture providing an operating environment according to an embodiment.

FIG. 7 is a block diagram illustrating a cable television services system 700 (hereafter referred to as "CATV") architecture providing an operating environment according to an embodiment. As can be appreciated, a CATV architecture is but one of various types of systems that may be utilized to provide substituted VOD content. Referring now to FIG. 7, digital and analog video programming, information content and interactive television services are provided via a hybrid fiber coax (HFC) network 155 to a television set 116 for consumption by a cable television/services system customer. As is known to those skilled in the art, HFC networks 155 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 155 allows for efficient bidirectional data flow between the client-side set-top box 118/117 and a server-side application server 740.

The CATV system 700 is in the form of a distributed client-server computing system for providing video and data flow across the HFC network 155 between server-side services providers (e.g., cable television/services providers) via a server-side head end 150 and a client-side customer via a client-side set-top box (STB) 118 in communication with a customer receiving device, such as the television set 116. As is understood by those skilled in the art, modern CATV systems 700 may provide a variety of services across the HFC network 155 including traditional digital and analog video programming, telephone services, high speed Internet access, video-on-demand, and information services.

On the client side of the CATV system 700, digital and analog video programming and digital and analog data are provided to the customer television set 116 via the set-top box (STB) 118/117. Interactive television services that allow a customer to input data to the CATV system 700 likewise are provided by the STB 118. As illustrated in FIG. 7, the STB 118/117 is a multipurpose computing device having a computer processor, memory, and an input/output mechanism. The input/output mechanism receives input from server-side processes via the HFC network 155 and from customers via input devices such as the remote control device 728, keyboard 730, or other computing device, such as a tablet/slate computer 114/112, mobile computing device 600, etc. The remote control device 728 and the keyboard 730 may communicate with the STB 118 via a suitable communication transport such as the infrared connection 732. The STB 118 also includes a video processor for processing and providing digital and analog video signaling to the television set 116 via a cable communication transport 734. A multi-channel tuner is provided for processing video and data to and from the STB 118 and the server-side head end system 150, described below.

The STB 118 also includes an operating system 722 for directing the functions of the STB 118 in conjunction with a variety of client applications 725. For example, if a client application 725 requires a news flash from a third-party news source to be displayed on the television set 116, the operating system 722 may cause the graphics functionality and video processor of the STB 118, for example, to output the news flash to the television set 116 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 118. The middleware layer 742 of the server-side application server and the middleware layer 724 of the client-side STB 118 may format data passed between the client side and server side according to the Extensible Markup Language (XML).

According to one embodiment, the set-top box 118 passes digital and analog video and data signaling to the television set 116 via a one-way communication transport 734. According to other embodiments, two-way communication transports may be utilized, for example, via high definition multimedia (HDMI) ports. The STB 118 may receive video and data from the server side of the CATV system 700 via the HFC network 155 through a video/data downlink and data via a data downlink. The STB 118 may transmit data from the client side of the CATV system 700 to the server side of the CATV system 700 via the HFC network 155 via one data uplink. The video/data downlink is an "in band" downlink that allows for digital and analog video and data signaling from the server side of the CATV system 700 through the HFC network 155 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 155 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 740 is typically passed through the "out of band" data links. Alternatively, an "in band" data carousel may be positioned in an "in band" channel into which a data feed may be processed from the server-side application server 740 through the HFC network 155 to the client-side STB 118. Operation of data transport between components of the CATV system 700, described with reference to FIG. 7, is well known to those skilled in the art.

Referring still to FIG. 7, the head end 150 of the CATV system 700 is positioned on the server side of the CATV system and includes hardware and software systems responsible for originating and managing content for distributing through the HFC network 155 to client-side STBs 118 for presentation to customers via television sets 116. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side set-top box 118 via the HFC network 155. As described above with reference to the set-top box 118, the application server 740 includes a middleware layer 742 for processing and preparing data from the head end of the CATV system 700 for receipt and use by the client-side set-top box 118. For example, the application server 740 via the middleware layer 742 may obtain data from third-party services 746 via the Internet 140 for transmitting to a customer through the HFC network 155 and the set-top box 118. For example, content metadata of a third-party content provider service may be downloaded by the application server 740 via the Internet 140. When the application server 740 receives the downloaded content metadata, the middleware layer 742 may be utilized to format the content metadata for receipt and use by the set-top box 118. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 118 through the HFC network 155 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 140 for provision to customers via the HFC network 155 and the set-top box 118.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for monitoring quality of content, comprising:

receiving a content item from a first content source via a communication network between a headend and a subscriber premises;

determining whether a quality level of the content item from the first content source via a first delivery mechanism for connecting via the communication network is degraded below a threshold;

if the quality level of the content item from the first content source via the first delivery mechanism for connecting via the communication network, between the headend and the subscriber premises, is degraded below the threshold, identifying if an alternative delivery mechanism of connecting via the communication network, between the headend and the subscriber premises, is available through which the same content item is provided over the network by the first content source with the quality level of the same content item above the threshold;
if the alternative delivery mechanism of connecting via the communication network, between the headend and the subscriber premises, is available with the quality level of the same content provided by the first content source above the threshold, while continuing to receive the content item switching to the alternative delivery mechanism for connecting via the communication network, between the headend and the subscriber premises, to receive the content item from the first content source;
if there is not an alternative delivery mechanism available where the same content item is provided by the first content source and is above the threshold, identifying a second content source that provides the same content item, the second content source providing the same content item at a second quality level above the threshold;
in response to identifying that the second content source providing the content item at the second quality level above the threshold, switching to the second content source; and receiving the same content item from the second content source.

2. The method of claim 1 further comprising:
at a later time, performing a check to determine whether the quality level of the content item is above the threshold; and
when the quality level of the content item is above the threshold, switching to the first content source.

3. The method of claim 1 further comprising identifying if a connectivity option is available through which the same content item is provided by the second content source, wherein the quality level of the same content item is above the threshold.

4. The method of claim 1, wherein the second content source comprises a nonlinear content source to provide the content item.

5. A method for providing wireless set-top box pairing, the method comprising:
receiving an indication of a selection of a content item from a viewing device;
identifying if a quality of transmission of the content item from a first linear television source over a communication network, between a headend and a subscriber premises, at a first constant bitrate meets a predetermined threshold;
if the quality of transmission of the content item from the first linear television source at the first constant bitrate does not meet the predetermined threshold,
identifying if an alternative delivery mechanism for connecting via the communication network, between the headend and the subscriber premises, is available for providing the content item at the first constant bitrate;
when an alternative delivery mechanism for connecting via the communication network, between the headend and the subscriber premises, is identified as available for providing the same content item at the first constant bitrate from the first linear television source, establishing a connection via the alternative delivery mechanism while continuing to provide the same content item at the first constant bitrate from the first linear television source;
if there is not an alternative delivery mechanism available where the same content item is provided by the first linear television source while meeting the predetermined threshold, identifying a second content source that provides the same content item, the second content source providing the same content item while meeting the predetermined threshold; and
in response to identifying that the second content source providing the content item meeting the predetermined threshold, switching to the second content source.

6. The method of claim 5, wherein identifying another connectivity option comprises identifying if another wired set top box is available to provide linear content.

7. The method of claim 5, wherein identifying another connectivity option comprises identifying a nonlinear content source to provide the content item.

8. The method of claim 7, wherein the nonlinear content source includes one or more of an Internet source, a DVR or a VOD library.

9. The method of claim 5, wherein the predetermined threshold is set based one or more of:
business rules;
business agreements;
the viewing device; or
a user profile.

10. The method of claim 5 further comprising:
at a later time, performing a check if the content item is available at the first constant bitrate from the first linear television source; and
when the content item is available at the first constant bitrate from the first linear television source, disconnecting from the alternative delivery mechanism and again providing the content item at the first constant bitrate from the first linear television source.

11. The method of claim 10 wherein performing the check if the content item is available at the first constant bitrate from the first linear television source comprises performing the check based in real time.

12. The method of claim 10 wherein performing the check if the content item is available at the first constant bitrate from the first linear television source comprises performing the check based at regular intervals.

13. A method for providing wireless set-top box pairing, the method comprising:
receiving an indication of a selection of a content item from a viewing device via a communication network between a headend and a subscriber premises;
identifying if a quality of transmission of the content item from a first linear television source over the communication network, between the headend and the subscriber premises, at a first constant bitrate meets a predetermined threshold; and
if the quality of transmission of the content item from the first linear television source at the first constant bitrate does not meet the predetermined threshold,
identifying if an alternative delivery mechanism for connecting via the communication network, between the headend and the subscriber premises, is available through which the same content item is provided by the first linear television source, wherein the quality of transmission of the same content item meets the predetermined threshold;
if the alternative delivery mechanism for connecting via the communication network, between the headend and the subscriber premises, is available with the quality level of the same content provided by the first linear television source above the threshold, while continuing to receive the content item switching to the alternative delivery mechanism for connecting via the communication network, between the head-end and the subscriber premises, to receive the content item from the first linear television source;

if there is not an alternative delivery mechanism available where the same content item is provided by the first linear television source while meeting the predetermined threshold, identifying if a second television source is available for providing the content item at a lower constant bitrate; and when the second television source is identified as available for providing the content item at the lower constant bitrate, tuning to the second television source and providing the content item at the lower constant bitrate from the second television source.

14. The method of claim 13 wherein the second television source is a nonlinear content source.

15. The method of claim 14 wherein the method utilizes timestamps to identify a playback position for the content item provided by the nonlinear content source.

16. The method of claim 14, wherein the nonlinear content source includes one or more of an Internet source, a DVR or a VOD library.

17. The method of claim 13, wherein the predetermined threshold is set based one or more of:
business rules;
business agreements;
the viewing device; or
user profile.

18. The method of claim 13 further comprising:
at a later time, performing a check to determine if the quality of transmission of the content item from the first linear television source at the first constant bitrate meets the predetermined threshold; and
if the quality of transmission of the content item from the first linear television source at the first constant bitrate meets the predetermined threshold, providing the content item at the first constant bitrate from the first linear television source.

19. The method of claim 18 wherein performing the check if the content item is available at the first constant bitrate from the first linear television source comprises performing the check based in real time.

20. The method of claim 18 wherein performing the check if the content item is available at the first constant bitrate from the first linear television source comprises performing the check based at regular intervals.

* * * * *